US008380905B2

(12) United States Patent
Djabbari et al.

(10) Patent No.: US 8,380,905 B2
(45) Date of Patent: Feb. 19, 2013

(54) ISOLATED COMMUNICATION BUS AND RELATED PROTOCOL

(75) Inventors: Ali Djabbari, Saratoga, CA (US); Rajaram Subramoniam, Cupertino, CA (US); Gerard Socci, Palo Alto, CA (US); Kosha Mahmodieh, Hayward, CA (US); Ali Kiaei, San Jose, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 363 days.

(21) Appl. No.: 12/800,770

(22) Filed: May 21, 2010

(65) Prior Publication Data

US 2011/0289248 A1 Nov. 24, 2011

(51) Int. Cl.
*G06F 13/00* (2006.01)
*G06F 13/36* (2006.01)

(52) U.S. Cl. ........................................ 710/110; 710/306

(58) Field of Classification Search .................. 710/110, 710/306
See application file for complete search history.

(56) References Cited

U.S. PATENT DOCUMENTS

| | | | | |
|---|---|---|---|---|
| 5,187,709 | A * | 2/1993 | Williamson et al. | 370/445 |
| 5,448,180 | A * | 9/1995 | Kienzler et al. | 326/15 |
| 6,463,495 | B1 * | 10/2002 | Angelo et al. | 710/305 |
| 6,636,923 | B1 * | 10/2003 | Meirsman et al. | 710/305 |
| 7,523,337 | B2 * | 4/2009 | Borkar et al. | 713/340 |
| 7,768,153 | B2 * | 8/2010 | Wang | 307/66 |
| 2004/0201279 | A1 * | 10/2004 | Templeton | 307/11 |
| 2005/0066087 | A1 * | 3/2005 | Wu | 710/63 |
| 2009/0240853 | A1 * | 9/2009 | Piggott | 710/104 |
| 2010/0281183 | A1 * | 11/2010 | Van Bebber | 710/5 |
| 2011/0215639 | A1 * | 9/2011 | Kurosaki | 307/9.1 |

OTHER PUBLICATIONS

National Semiconductor Corporation, User's graphical user Interface (GUI) for LP555x evalauation board powerwise technology compliant energy management unit, 2007, AN-1653.*
Arm, Powerwise Interface 2.0 Specification 1.0, Sep. 16, 2005.*
"Quad-Channel Digital Isolators, ADuM1400/ADuM1401/ADuM1402", 2003-2008 Analog Devices, 32 pages.
"8 to 12 Cell Li-Ion Battery Overcurrent Protection and Analog Front End Chip Set", Intersil, Nov. 2, 2007, pp. 1-33.

(Continued)

*Primary Examiner* — Paul R Myers
*Assistant Examiner* — Christopher A Daley
(74) *Attorney, Agent, or Firm* — Eugene C. Conser; Wade J. Brady, III; Frederick J. Telecky, Jr.

(57) ABSTRACT

A system includes a master device and multiple slave devices. The system also includes multiple bus interfaces forming a communication bus that couples the master and slave devices. Each bus interface includes a primary interface unit configured to communicate over first and second buses, where the first and second buses form a portion of the communication bus. Each bus interface also includes a secondary interface unit configured to communicate with the primary interface unit and to communicate with one of the slave devices over a third bus. Each bus interface further includes an isolator configured to electrically isolate the primary interface unit and the secondary interface unit. The primary interface unit is configured to receive multiple commands over the first bus, execute a first subset of commands, transmit a second subset of commands over the second bus, and transmit a third subset of commands over the third bus.

15 Claims, 7 Drawing Sheets

OTHER PUBLICATIONS

"PowerLAN Master Gateway Battery Management Controller With PowerPump Cell Balancing Technology", Texas Instruments, Apr. 2009, 31 pages.

"Multicell Battery Stack Monitor", Linear Technology Corporation, 2009, pp. 1-38.

"Comprehensive product portfolio fits all analog/mixed-signal automotive needs", Maxim Integrated Products, Inc., Automotive Design Guide, Apr. 2008, pp. 1-32, see esp. p. 16.

"12-Channel, High-Voltage Battery-Pack Fault Monitor", Maxim Integrated Products, May 2009, pp. 1-27.

* cited by examiner

ISOLATED COMMUNICATION BUS AND RELATED PROTOCOL

TECHNICAL FIELD

This disclosure is generally directed to communication buses. More specifically, this disclosure relates to an isolated communication bus and related protocol.

BACKGROUND

Many systems use multiple modules that are daisy-chained or coupled in series, where the ground potential of one module is set by a prior module. For example, many systems use batteries coupled in series to form a battery stack. If each battery is designed to provide +5V and each module includes ten batteries, the first module can have a 0V ground potential, the second module can have a +50V ground potential, the third module can have a +100V ground potential, and so on. Depending on the number of batteries and modules used, a module could have a +500V ground potential or more. Example systems where this may occur include photovoltaic (PV) or solar power farms, battery charging systems, and the like. These high-voltage ground potentials can present a problem if a controller at a +0V ground potential needs to communicate with the modules since each module is at a different reference potential.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 8, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
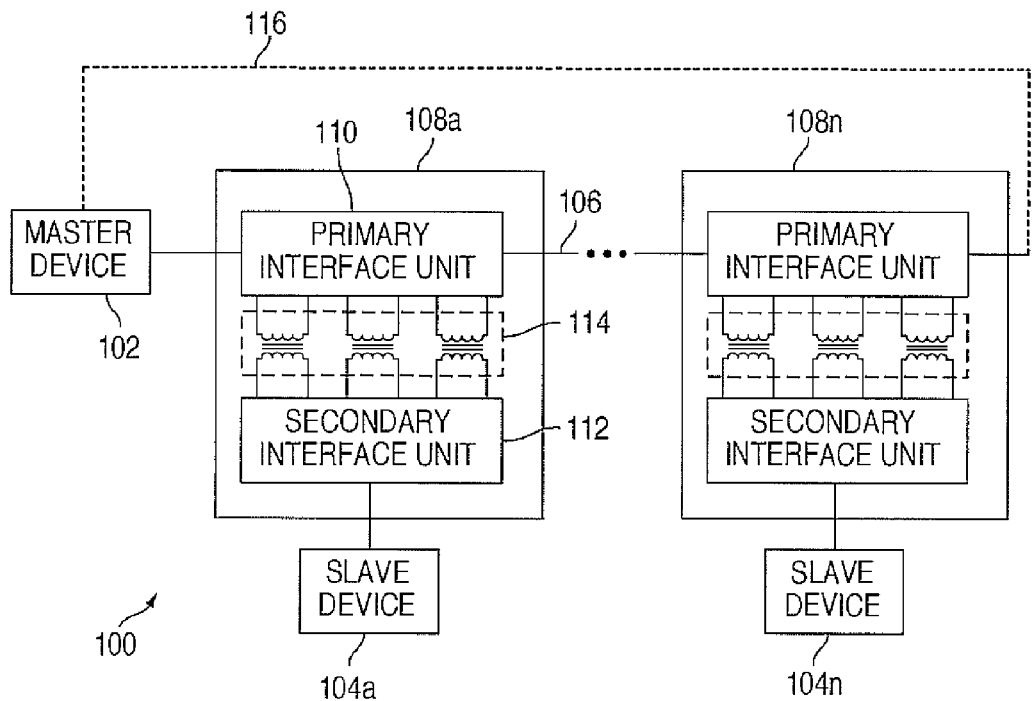
FIG. 1 illustrates an example stacked system with an isolated communication bus according to this disclosure.

FIG. 1 illustrates an example stacked system 100 with an isolated communication bus according to this disclosure. As shown in FIG. 1, the system 100 includes a master device 102, multiple slave devices 104a-104n, and a communication bus 106. The master device 102 and the slave devices 104a-104n generally denote devices that can communicate with each other over the bus 106. The master device 102 and the slave devices 104a-104n could provide any suitable functionality.

In some embodiments, the master device 102 represents a controller or other device that monitors or controls operation of the slave devices 104a-104n. For example, the slave devices 104a-104n could represent devices for measuring and adjusting voltages across batteries, and the master device 102 could represent a controller that adjusts operation of the slave devices 104a-104n based on the measured voltages. The master device 102 and the slave devices 104a-104n could perform any other or additional functions according to particular needs. In some embodiments, the master device 102 and the slave devices 104a-104n represent devices implementing the POWERWISE INTERFACE (PWI) standard from NATIONAL SEMICONDUCTOR CORPORATION.

The bus 106 couples the master device 102 and the slave devices 104a-104n and transports signals between the devices. For example, the bus 106 could represent a PWI bus that includes at least one clock signal line and at least one data line. The data line(s) could be used to transport data between two or more devices, and the clock signal line(s) could be used to transport one or more clock signals associated with the data. The bus 106 could represent any other suitable communication bus capable of transporting data between devices. Also, the bus 106 could include any number of signal lines, including a single signal line.

In this example, the ground potentials of the slave devices 104a-104n can vary quite significantly. For example, the slave device 104a could have a ground potential of 0V, the slave device 104b could have a ground potential of +50V, and the slave device 104n could have a ground potential of +500V or more. This makes it difficult for the master device 102 (which could have a 0V ground potential) to communicate with the slave devices 104a-104n over a single bus 106.

In accordance with this disclosure, bus interfaces 108a-108n are coupled between the bus 106 and the slave devices 104a-104n, respectively. The bus interfaces 108a-108n isolate various voltages of the slave devices 104a-104n from the bus 106. Because of this isolation, the master device 102 is able to communicate with the slave devices 104a-104n over the bus 106 even when those slave devices 104a-104n have significantly different ground potentials (such as 0V and +500V).

In this example, each bus interfaces 108a-108n includes a primary interface unit 110, a secondary interface unit 112, and an isolator 114. The primary interface unit 110 can communicate with multiple adjacent devices in FIG. 1, such as the master device 102 and/or one or more other bus interfaces. The primary interface unit 110 can also determine whether received data is meant for its associated slave device and, if so, transmit the data to the secondary interface unit 112. The secondary interface unit 112 can transmit data to and receive data from the associated slave device 104a-104n. In addition, the primary interface unit 110 and the secondary interface unit 112 support a mechanism to communicate with each other across the isolator 114.

The isolator 114 electrically isolates the primary interface unit 110 from the secondary interface unit 112. This allows the primary interface units 110 in the bus interfaces 108a-108n to be referenced to a common ground potential (such as 0V), while the secondary interface units 112 in the bus interfaces 108a-108n are referenced to different ground potentials (such as 0V-500V). The isolator 114 can use any suitable electrical isolation mechanism. While the isolator 114 is shown as using transformers in FIG. 1, any suitable isolation technique could be used, such as galvanic or capacitive isolation techniques.

The primary interface unit 110 and the secondary interface unit 112 include any suitable structures for communicating data over an electrical isolator. The isolator 114 includes any suitable structure for electrically isolating or separating multiple domains.

In some embodiments, the system 100 may operate as follows. When the system 100 is reset or powers on, the master device 102 can broadcast a disconnect or reset command over the bus 106, which causes all bus interfaces 108a-108n to reset. The master device 102 then transmits commands to enumerate the bus interfaces 108a-108n, which assigns unique addresses to the bus interfaces 108a-108n. At this point, the master device 102 can transmit read, write, and other commands to individual bus interfaces 108a-108n using their unique addresses. The master device 102 can also broadcast commands to multiple bus interfaces 108a-108n. The commands may be directed at the bus interfaces 108a-108n, in which case the bus interfaces 108a-108n execute these commands. The commands may also be directed at the associated slave devices 104a-104n, in which case the bus interfaces 108a-108n pass the commands to the slave devices 104a-104n. In addition, data (including interrupts generated in response to faults) can be sent from the bus interfaces 108a-108n to the master device 102.

In this way, the master device 102 is able to communicate with multiple slave devices 104a-104n that have different ground reference potentials. Moreover, the master device 102 is able to collect information from and provide information to the slave devices 104a-104n in a timely manner. In addition, the isolation technique described here could be used with a wide range of communication bus protocols, such as the SPI, I²C, CAN, and LIN protocols. As described below, any of these or other protocols can be modified to support the use of the bus interfaces 108a-108n.

As described below, an optional communication link 116 can be used to couple the master device 102 to the last bus interface 108n in the chain. This communication link 116 can be used to detect when the communication bus 106 has been broken, such as when a link fails between two of the bus interfaces 108a-108n. This could also occur if one of the bus interfaces 108a-108n fails.

Although FIG. 1 illustrates one example of a stacked system 100 with an isolated communication bus, various changes may be made to FIG. 1. For example, the system 100 could include any number of master devices, slave devices, buses, and bus interfaces. Also, the functional division shown in FIG. 1 is for illustration only. Various components in FIG. 1 could be combined, further subdivided, or omitted and additional components could be added according to particular needs. For instance, a bus interface could be incorporated into or form a part of a slave device.

Figure 2:
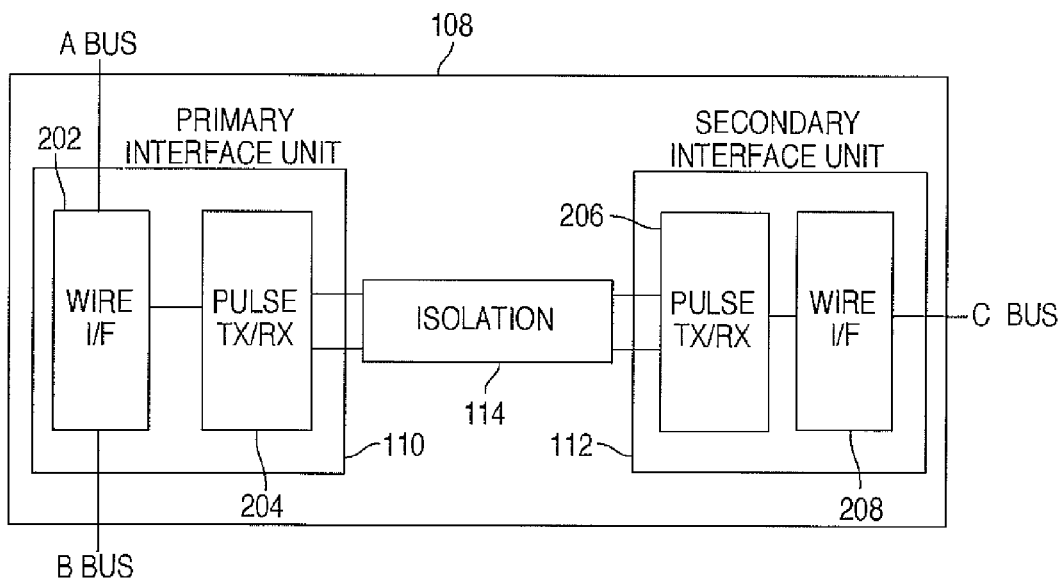
FIG. 2 illustrates an example bus interface supporting an isolated communication bus according to this disclosure.

FIG. 2 illustrates an example bus interface 108 supporting an isolated communication bus according to this disclosure. As shown in FIG. 2, the bus interface 108 is coupled to an A bus, a B bus, and a C bus. The A and B buses collectively form part of the communication bus 106. For example, the A bus can couple the bus interface 108 to a lower device in a stack, while the B bus can couple the bus interface 108 to a higher device in a stack. The A and B buses can be at the same ground potential as the master device 102, thereby avoiding problems associated with different ground potentials. The C bus can be coupled to a slave device 104a-104n. The C bus is isolated and can be at the same ground potential as the slave device, which could vary greatly from bus interface to bus interface.

In this example, the primary interface unit 110 includes a wire interface 202 and a pulse transceiver (TX/RX) 204. The wire interface 202 facilitates the transmission and reception of digital data over the A and B buses. The wire interface 202 includes any suitable structure for transmitting or receiving digital signals over a bus, such as a microwire bus (although other serial bus interfaces could be used).

The pulse transceiver 204 generates pulses representing digital data received from the wire interface 202, and the pulse transceiver 204 transmits the pulses over the isolator 114 to the secondary interface unit 112. Effectively, the pulse transceiver 204 transmits the edges of a digital signal over the isolator 114 as pulses. The pulse transceiver 204 also receives pulses transmitted by the secondary interface unit 112 over the isolator 114 and regenerates digital data, which can be passed to the wire interface 202 for transmission over the A or B bus. Note that other wave shaping approaches could be used to transport digital data over a transformer or other isolator 114.

The pulse transceiver 204 includes any suitable structure for transmitting pulses based on digital data and reconstructing digital data based on received pulses. In particular embodiments, the pulse transceiver 204 includes XOR logic for transmitting data. The XOR logic performs a logical XOR operation of a digital data signal and a delayed version of the digital data signal. This generates pulses at the rising and falling edges of the digital data signal. The width of each pulse can be controlled by adjusting the amount delay provided. For receiving and reconstructing a digital data signal, the pulse transceiver 204 could include a latch that toggles back and forth using received pulses to recreate the rising and falling edges of digital data, and a state machine can differentiate between the rising and falling edges. The latch can be enabled using a latch enable signal.

The secondary interface unit 112 similarly includes a pulse transceiver 206 and a wire interface 208. The pulse transceiver 206 transmits pulses over the isolator 114 based on digital data received over the C bus. The pulse transceiver 206 also regenerates digital data based on pulses received from the primary interface unit 110 over the isolator 114. The wire interface 208 facilitates transmission and reception of digital data over the C bus.

In some embodiments, the primary interface unit 110 effectively functions as a switch controller. When the master device 102 transmits a command to a particular bus interface, the primary interface unit 110 can determine if the address (or other identifier) for the intended recipient is its own address. If so, the primary interface unit 110 can execute the command or pass the command to its associated slave device, depending on the command. Otherwise, the primary interface unit 110 can pass the command out over the B bus to the next bus interface. Effectively, the primary interface unit 110 receives multiple commands over the A bus, executes a first subset of the commands, transmits a second subset of the commands over the B bus, and transmits a third subset of the commands over the C bus. Note that the subsets may overlap, such as when a broadcast command is both executed by a bus interface and transmitted to another bus interface. The primary interface unit 110 can also receive data over its B bus, optionally store the data as described below, and transmit the data over its A bus. These operations are for illustration only, and the primary interface unit 110 could operate in other ways. The secondary interface unit 112 can decode commands received from the primary interface unit 110 and take appropriate action(s).

Although FIG. 2 illustrates one example of a bus interface 108 supporting an isolated communication bus, various changes may be made to FIG. 2. For example, each pulse transceiver 204-206 could include a transmitter and a separate receiver. Also, the pulse transceivers 204-206 could be replaced by H-bridge transmitters and corresponding receivers or other devices, and resonance structures can be used to improve efficiency.

Figure 3:
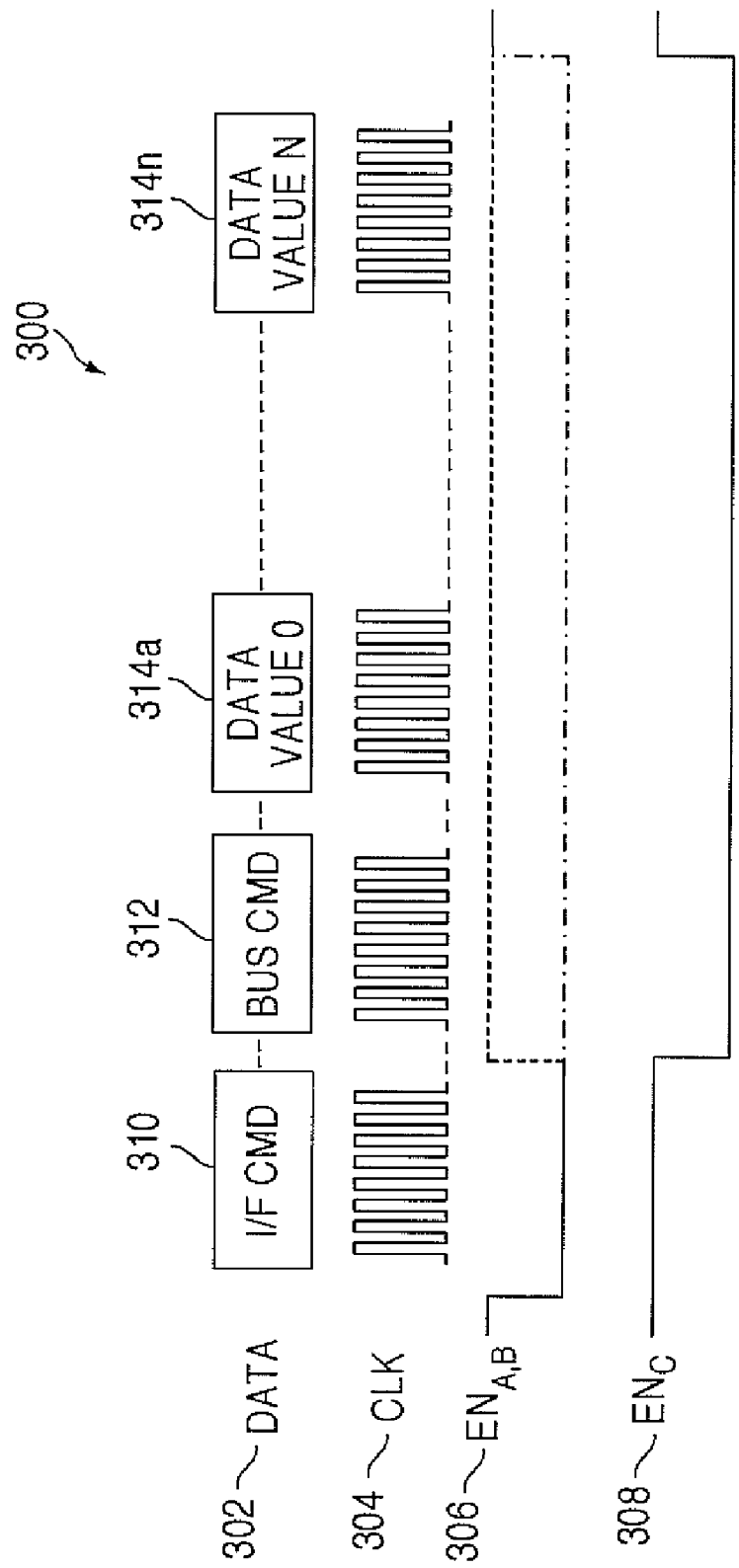
FIG. 3 illustrates an example timing diagram for communications over an isolated communication bus according to this disclosure.

FIG. 3 illustrates an example timing diagram 300 for communications over an isolated communication bus according to this disclosure. As shown in FIG. 3, multiple signals can be transmitted over an isolated communication bus. In this example, the signals include a data signal 302, a clock signal 304, a first enable signal 306, and a second enable signal 308.

The data signal 302 here includes an interface command 310, a bus command 312, and one or more data values 314a-314n related to the interface or bus command. The interface command 310 represents a command to be executed by one or more bus interfaces 108a-108n. The interface command 310 could, for example, represent a command to enumerate or configure a bus interface 108a-108n. The interface command 310 could also represent a command that causes a bus interface 108a-108n to read or write data. When the interface command 310 is a write command, the interface command 310 could be followed by one or more data values 314a-314n (without any intervening bus command 312). Each interface command 310 can be identified in FIG. 3 when the enable signal 306 goes low and the enable signal 308 remains high. An interface command 310 could be handled by the appropriate bus interface(s) 108a-108n without any recognition of those commands by the slave devices 104a-104n. In other words, the slave devices 104a-104n may be completely unaware of the interface commands 310.

The bus command 312 generally denotes a command executed by one or more slave devices 104a-104n. The bus command 312 could, for example, be received by a bus interface and then passed to a slave device. The bus command 312 could represent any suitable command supported by any suitable protocol, such as the SPI protocol. The bus command 312 could be followed by one or more data values 314a-314n, depending on the particular command. Each bus command 312 can be identified in FIG. 3 when the enable signal 306 and the enable signal 308 are low.

In this way, the interface commands 310 allow the master device 102 to interact with and control the operation of the bus interfaces 108a-108n, while the bus commands 312 allow the master device 102 to interact with and control the operation of the slave devices 104a-104n. In some embodiments, each interface command 310 is eight bits, each bus command 312 is eight bits, and each data value 314a-314n is eight bits.

The clock signal 304 identifies the different bit positions within the data signal 302. The enable signal 306 identifies when an interface command 310, bus command 312, or data value 314a-314n is being transmitted. The enable signal 308 identifies when a bus command 312 or data value 314a-314n is being transmitted. Using the enable signals 306-308, a bus interface 108a-108n can easily identify an interface command 310 and take appropriate action if needed. The bus interface 108a-108n can also easily identify a bus command 312 and pass the command to a slave device if needed.

In some embodiments, different types of interface commands 310 could be supported. For example, "configuration" interface commands 310 could be used to control or alter the configuration of the bus interfaces 108a-108n. "Communication" interface commands 310 could be used to trigger reading and writing of data to and from the bus interfaces 108a-108n. In particular embodiments, the enable signal 306 can be used to distinguish between configuration and communication interface commands 310. For instance, the enable signal 306 could go low for eight bits and then go high when a configuration interface command 310 is being transmitted. The enable signal 306 could also go low for at least sixteen bits when a communication interface command 310 is being transmitted.

Example eight-bit configuration interface commands 310 are shown in Table 1.

TABLE 1

| Function | Configuration Interface Command | | | | | | | |
|---|---|---|---|---|---|---|---|---|
| | 7 | 6 | 5 | 4 | 3 | 2 | 1 | 0 |
| Set Delay | x | te | cal | d | d | d | 0 | 0 |
| Configure Device ID | x | n | n | n | n | n | 1 | 1 |
| Disconnect Devices | x | 0 | 0 | 0 | 0 | 0 | 1 | 1 |
| Configure Burst Length | b | b | b | b | b | b | 0 | 1 |
| Configure Lock AB Dir | 1 | n | n | n | n | n | 1 | 0 |
| Configure Unlock AB Dir | 0 | x | x | x | x | x | 1 | 0 |

The Set Delay command sets the delay used by the pulse transceivers 204-206 to generate the pulses that are transmitted over the isolator 114. In other words, the Set Delay command controls the amount by which one copy of a signal is delayed before being XORed with a non-delayed copy of the signal, which effectively controls the width of the pulses. The default delay upon a reset could be 000 corresponding to a 2 ns delay, and every increment in the ddd value could increase the pulse width by an average of 2 ns (although other default and increment values could be used). This may allow, for example, the pulse transceivers 204-206 to be used with different types of transformers.

One of the bits in the Set Delay command could also be used as a timeout enable ("te") bit, which indicates whether the bus interface resets its latch enable signal to a non-asserted value (such as one) when the latch enable signal is asserted but no data is being sent for more than a specified amount of time (such as 50 ms). This can be done to help correct the polarity of the latch enable signal and enable the state machine in the pulse transceiver to distinguish rising and falling edges properly. Another of the bits in the Set Delay command could be used as a calibration ("cal") bit, which could be used to trigger calibration of a slave device, such as an analog-to-digital converter.

The Configure Device ID command is used to enumerate the bus interfaces 108a-108n. For example, upon a reset, all bus interfaces 108a-108n may be in a disconnected mode where their addresses are zero and their primary bus interfaces 110 have disconnected themselves from their B buses. The master device 102 issues a Configure Device ID command with an nnnnn address of 00001, which is received over the A bus of the bus interface 108a and assigns an address of "1" to the bus interface 108a. Once the bus interface 108a obtains a non-zero address, the bus interface 108a connects its B bus to its neighbor. The master device 102 then issues a Configure Device ID command with an nnnnn address of 00010, which is passed by the bus interface 108a to the A bus of the bus interface 108b. This assigns an address of "2" to the bus interface 108b and causes the bus interface 108b to connect its B bus to its neighbor. This process continues until all of the bus interfaces 108a-108n have been assigned addresses. After each Configure Device ID command, the master device 102 can determine whether another device has been successfully enumerated by writing specified data to the most recent nnnnn address and attempting to read that data from the address. If the master device 102 cannot write data to and read the same data from the most recent nnnnn address, this can cause the master device 102 to end the enumeration process. In this way, multiple instances of the bus interfaces 108a-108n (which may be identical in structure) can be coupled to the master device 102 and enumerated without requiring manual assignment of address, such as through physical dip switches or programming an internal memory.

The Disconnect Devices command causes all of the bus interfaces 108a-108n to reset. When this command is received, each bus interface 108a-108n resets its address to zero and disconnects its primary bus interface 110 from its B bus.

The Configure Burst Length command is used to set the burst length of data transmissions by the bus interfaces 108a-108n. For example, the bbbbbb value could define the burst length in bytes. A default value of 000001 could represent sixteen bits, and each increment of the bbbbbb value could increase the burst length by eight bits (although other default and increment values could be used).

The Configure Lock/Unlock AB Dir commands are used to lock and unlock the direction of communication through the A and B buses of one or more bus interfaces. This can be used when a break or other problem is detected in the communication bus 106. For example, when the master device 102 sends a command over the bus 106, the master device 102 can determine if the same command is received over the link 116 from the last bus interface 108n. If so, this indicates that the bus 106 is operating correctly. If not, this indicates that the command may have failed to reach one or more of the bus interfaces 108a-108n. In this case, the master device 102 can broadcast the Configure Lock AB Dir command over the communication bus 106 starting with the bus interface 108a. The nnnnn address is used to indicate that all bus interfaces up through that address are to lock the direction of their A and B buses. The master device 102 can also send a number of toggle or other signals over the communication link 116 (such as 2,500 or 4,000 clock pulses), which cause any bus interfaces that receive the toggles to switch the directions of their A and B buses. Effectively, this causes the bus interfaces before a break in the bus 106 to maintain their current communication path, while the bus interfaces after the break reverse their current communication path. Ideally, the master device 102 can then remain in communication with most or all of the bus interfaces. The Configure Unlock AB Dir command can be used to unlock the A and B buses in one or more of the bus interfaces.

Example eight-bit communication interface commands 310 are shown in Table 2.

TABLE 2

| Function | Configuration Interface Command | | | | | | | |
|---|---|---|---|---|---|---|---|---|
| | 7 | 6 | 5 | 4 | 3 | 2 | 1 | 0 |
| Single Device Read Internal | x | n | n | n | n | n | 0 | 0 |
| Broadcast Read Internal | x | 0 | 0 | 0 | 0 | 0 | 0 | 0 |
| Single Device Read External | x | n | n | n | n | n | 0 | 1 |
| Broadcast Read External | x | 0 | 0 | 0 | 0 | 0 | 0 | 1 |
| Single Device Write Internal | x | n | n | n | n | n | 1 | 0 |
| Broadcast Write Internal | x | 0 | 0 | 0 | 0 | 0 | 1 | 0 |
| Single Device Write External | x | n | n | n | n | n | 1 | 1 |
| Broadcast Write External | x | 0 | 0 | 0 | 0 | 0 | 1 | 1 |

The "Single Device" commands refer to commands to be executed by a single bus interface 108a-108n, while the "Broadcast" commands refer to commands to be executed by all of the bus interfaces 108a-108n. The "Read" commands cause one or more of the bus interfaces 108a-108n to read data from a source and provide the data to the master device 102. The "Write" commands cause one or more of the bus interfaces 108a-108n to write data from the master device 102 to a source. The "Internal" commands refer to read or write commands involving internal registers or other structures within the bus interfaces 108a-108n. The "External" commands refer to read or write commands involving registers or other structures external to the bus interfaces 108a-108n (such as within the slave devices 104a-104n).

Note that other or additional communications can also occur between the master device 102 and the bus interfaces 108a-108n. For example, between transactions (such as between interface commands 310 or after a bus command 312), a bus interface 108a-108n could transmit an interrupt or other signal to the master device 102. The interrupt could indicate to the master device 102 that a problem has been detected by one or more bus interfaces or their associated slave devices.

Although FIG. 3 illustrates one example of a timing diagram 300 for communications over an isolated communication bus, various changes may be made to FIG. 3. For example, each command or data value could include any number of bits. Also, as noted above, the interface commands 310, bus commands 312, data values 314-314n, and other signals could be transmitted in any order over the bus.

Figure 4:
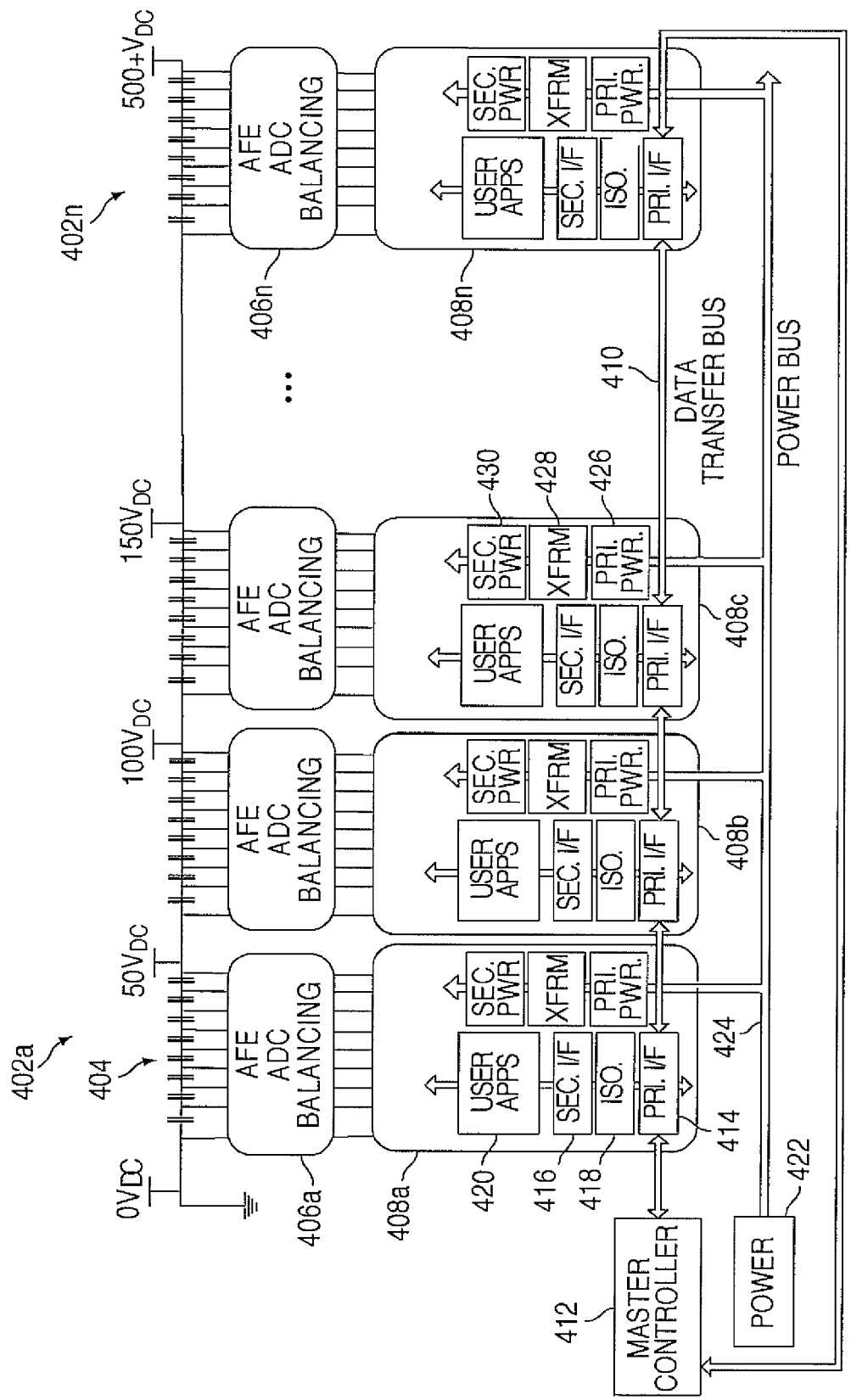
FIGS. 4 through 6 illustrate more specific example systems with isolated communication buses according to this disclosure.
Figure 5:
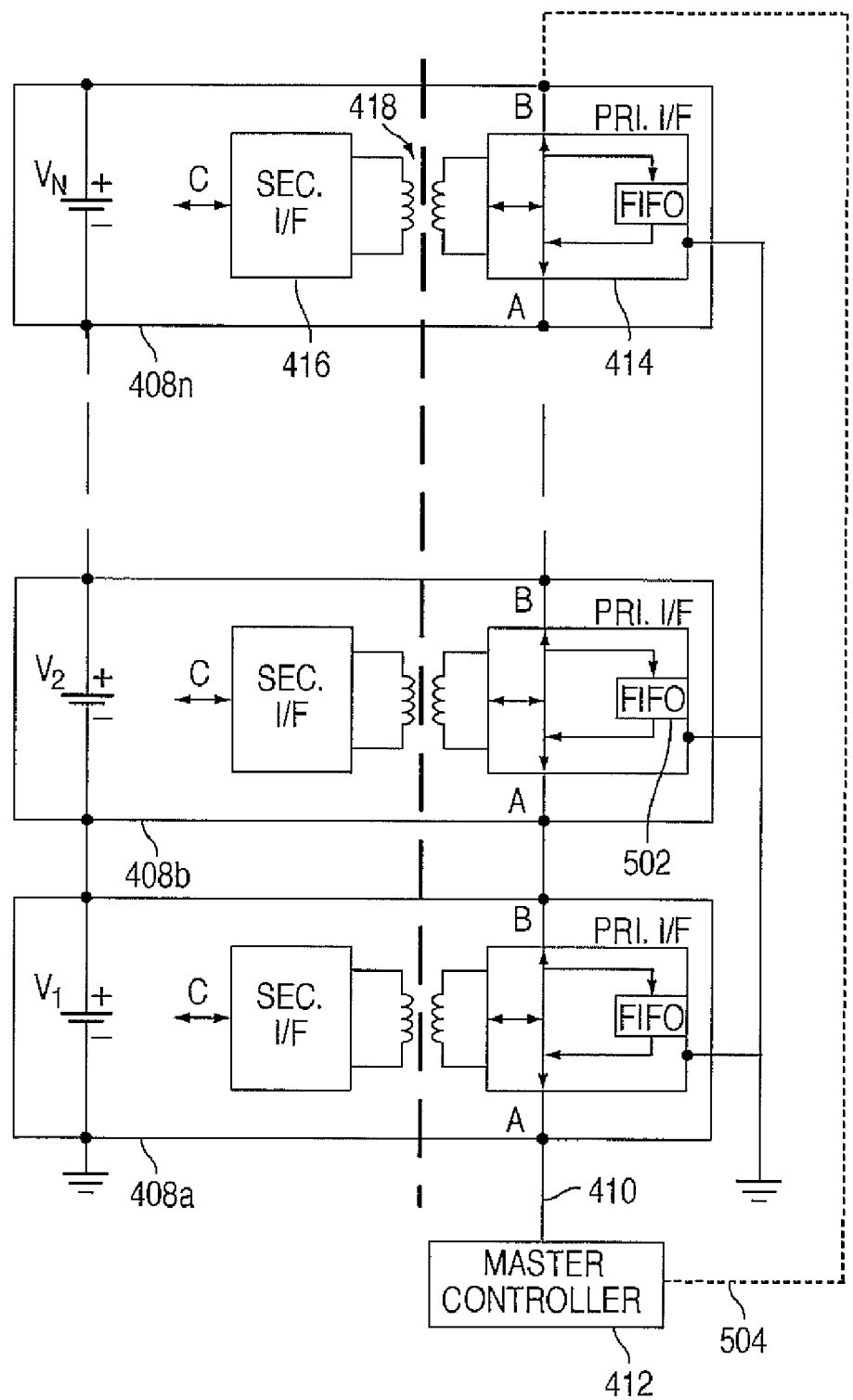
Figure 6:
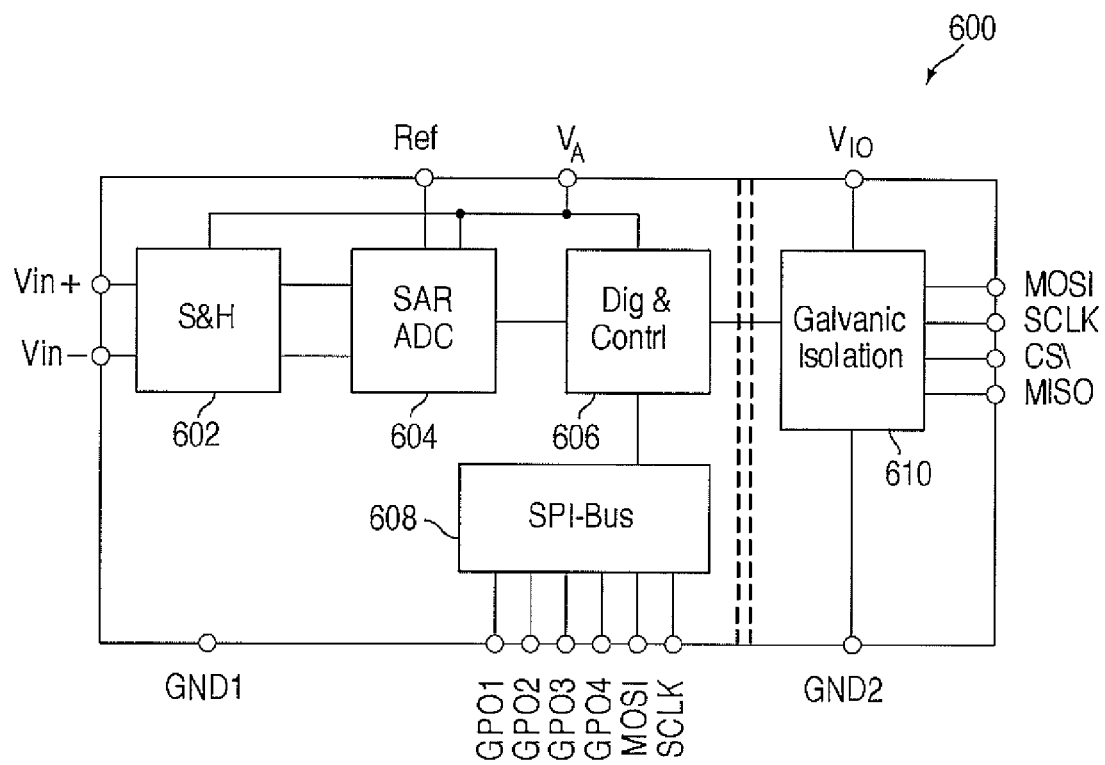

FIGS. 4 through 6 illustrate more specific example systems with isolated communication buses according to this disclosure. These example systems could use the same or similar isolated communication bus described above.

As shown in FIG. 4, a system 400 is used to monitor and control a voltage supply stack. The voltage supply stack includes multiple modules 402a-402n coupled in series, where each module 402a-402n includes multiple voltage sources 404 coupled in series. Each voltage sources 404 represents any suitable structure for storing and providing a voltage, such as a battery or super-capacitor. Each voltage source 404 could be designed to provide a specified amount of voltage, such as about +5V up to a maximum of about +5.5V. Also, each module 402a-402n could include any number of voltage sources 404 and can provide a specified amount of voltage, such as ten voltage sources that provide about +50V.

Each module 402a-402n is associated with a module monitor 406a-406n. Each module monitor 406a-406n generally includes circuitry or other structures for monitoring the operation of the associated module. Each module monitor 406a-406n could also include circuitry or other structures for controlling or adjusting the operation of the associated module. In this example, each module monitor 406a-406n includes at least one analog front end (AFE) and at least one analog-to-digital converter (ADC). Each AFE can be coupled across at least one of the voltage sources 404, and each ADC can digitize analog values output by an AFE. This may allow, for example, the module monitors 406a-406n to generate digital measurements of the voltage across each voltage source 404. Each module monitor 406a-406n could also include passive or active balancing circuitry, which can be used to charge up a subset or all of the voltage sources 404 in each module (including a single voltage source). Charging a subset of the voltage sources 404 may allow weaker voltage sources to be charged closer to stronger voltage sources, thereby balancing the voltages of the sources. Example balancing circuits are disclosed in U.S. Provisional Patent Application No. 61/243,072 filed on Sep. 16, 2009 (which is hereby incorporated by reference).

As shown in FIG. 4, the module monitors 406a-406n are at progressively higher potentials. The module monitor 406a can be at a 0V ground potential, while the module monitor 406n could be at a +450V ground potential or more. Each module monitor 406a-406n is respectively coupled via a bus interface 408a-408n to a bus 410, which is coupled to a master controller 412. Each bus interface 408a-408n includes a primary interface unit 414, a secondary interface unit 416, and an isolator 418. These components 414-418 may be the same as or similar to the components 110-114 described above. The components 414-418 isolate higher potentials of the module monitors from a lower potential used by the master controller 412. Each bus interface 408a-408n also includes one or more user applications 420, which can perform any desired functions in the system 400. For instance, a user application 420 could monitor the voltages across the voltage sources 404 in a module and provide voltage measurements to the controller 412. Any other or additional user applications 420 could also be used.

The master controller 412 performs various operations to monitor and control the operation of the bus interfaces 408a-408n and the module monitors 406a-406n. For example, the master controller 412 can cause the bus interfaces 408a-408n to capture voltage measurements of the voltages across the voltage sources 404, where those voltages are provided by the module monitors 406a-406n. The master controller 412 can also retrieve the measurements over the bus 410 and use to measurements to control the operation of the system 400 or a larger device or system powered by the system 400.

In this example, various components in the system 400 are powered by a power supply 422, which provides operating power to the components over a power bus 424. To help isolate the power bus 424, each bus interface 408a-408n also includes a primary power interface 426, a transformer 428, and a secondary power interface 430. The primary power interface 426 receives a voltage from the power bus 424 and provides the voltage to the transformer 428, which induces a voltage in the secondary power interface 430. The secondary power interface 430 then provides the voltage to, for example, a bus interface or a module monitor. Note that any suitable amount of power could be provided via the bus interface, such as 1 W, 2 W, or more.

With reference to FIG. 5, communications between the master controller 412 and the bus interfaces 408a-408n could occur as shown in FIG. 3 above. The master controller 412 could transmit "configuration" interface commands 310 to reset the bus interfaces 408a-408n, enumerate the bus interfaces 408a-408n, or set the burst lengths for the bus interfaces 408a-408n. The master controller 412 could also transmit "communication" interface commands 310 for reading data from or writing data to the bus interfaces 408a-408n.

As an example, the master controller 412 could transmit a read command to the bus interface 408b, causing the bus interface 408b to transmit data to the master controller 412 through the bus 410 via the bus interface 408a. The master controller 412 could also transmit a write command to the bus interface 408b through the bus 410 via the bus interface 408a, causing the bus interface 408b to write data. In either case, when data is addressed to a higher bus interface, a "lower" bus interface can allow data to pass. "Lower" and "higher" bus interfaces refer to bus interfaces with lower and higher addresses, respectively. Each bus interface could also transmit interrupts or other messages to the master controller 412, such as upon the detection of a fault in a module.

The master controller 412 could also transmit a broadcast write command, causing all of the bus interfaces 408a-408n to write data internally or externally. This could be done, for example, to cause all bus interfaces 408a-408n to send measurement commands to the module monitors 406a-406n, which causes all of the module monitors 406a-406n to measure the voltages across the modules or voltages sources at or near the same time. This could allow, for instance, the module monitors 406a-406n to capture a snapshot of the voltages provided in the modules 402a-402n.

The master controller 412 could further transmit a broadcast read command, causing all of the bus interfaces 408a-408n to transmit internally or externally stored data to the master controller 412. This could be done, for example, to collect the voltage measurements taken by the module monitors 406a-406n. Ordinarily, the bandwidth of communications between the master controller 412 and a bus interface would depend on the distance from the master controller 412 to the bus interface, so the bandwidth between the master controller 412 and the bus interface 408n would typically be quite low. To help increase the speed of read operations, each primary interface 414 in the bus interfaces 408a-408n includes a queue 502, which in this example represents a first in, first out (FIFO) queue. Each queue 502 can receive and store data from a higher bus interface. When the master controller 412 transmits a broadcast read command, the bus interface 408a transmits its data value to the master controller 412. At the same time, the bus interface 408b transmits its data value to the queue 502 in the bus interface 408a, the bus interface 408c transmits its data value to the queue 502 in the bus interface 408b, and so on. Assuming the master controller 412 receives a single data value in each time slot, the master controller 412 would use n time slots to receive the data values from n bus interfaces 408a-408n. This helps to increase the bandwidth of the bus 410, such as by allowing the bus 410 to achieve bandwidths of up to 10 MB/s or more.

An optional communication link 504 can also be used to couple the master controller 412 to a last of the bus interfaces 408n. The communication link 504 can be used to detect breaks in the bus 410. In response to a detected break, the master controller 412 can cause the bus interfaces before the break to lock the direction of communication through their A and B buses. The master controller 412 can also cause the bus interfaces after the break to reverse the direction of communication through their A and B buses. The master controller 412 can then communicate with the bus interface 408a as described above and with the bus interface 408n over the link 504. Ideally, this allows the master controller 412 to communicate with most or all of the bus interfaces despite the break in the bus 410.

Note that while the bus interfaces in the above figures have been shown as being coupled in a daisy-chained (serial) manner along their A and B buses, other configurations could be used. For example, the A buses of the bus interfaces could be coupled in parallel to the master device, while their enable ($EN_{A,B}$) inputs are coupled in series to the master. An other example, the A buses of the bus interfaces could be coupled in parallel to the master device, and their enable ($EN_{A,B}$) inputs could be coupled in parallel to the master device. Obviously, different enumeration techniques could be used depending on the configuration of the bus interfaces.

FIG. 6 illustrates an example isolated analog-to-digital converter (ADC) 600, which includes a sample and hold circuit 602 that samples and holds an input voltage defined using differential inputs $V_{IN+}$ and $V_{IN-}$. The sampled voltage is provided to a successive approximation register (SAR) ADC 604, which digitizes the sampled voltage. A control unit 606 controls the ADC 600, and a bus interface 608 supports communication over a serial bus (SPI in this example). An isolator 610 isolates the components 602-608 from another bus, allowing the control unit 606 to communicate over an isolated bus. The isolator 610 includes any suitable electrical isolation structure, such as a Galvanic isolator.

Although FIGS. 4 through 6 illustrate more specific examples of systems with isolated communication buses, various changes may be made to FIGS. 4 through 6. For example, each system could include any number of each component shown. Also, an isolated communication bus could be used in any suitable system requiring isolation, such as systems using inverters or chargers or in battery management systems, LED lighting systems, cell balancing systems, or smart meters.

Figure 7:
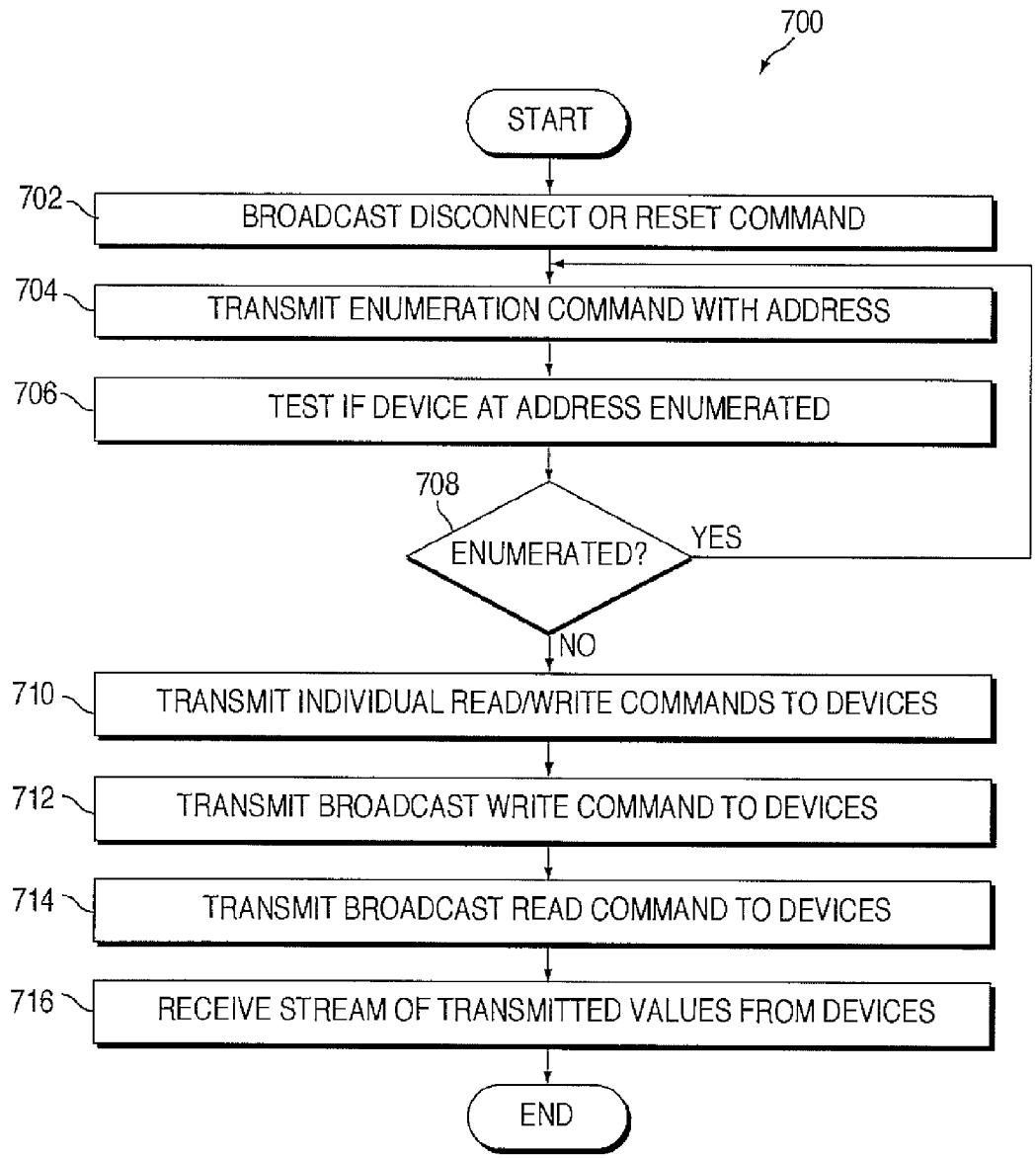
FIGS. 7 and 8 illustrate example methods for communicating over an isolated communication bus according to this disclosure.
Figure 8:
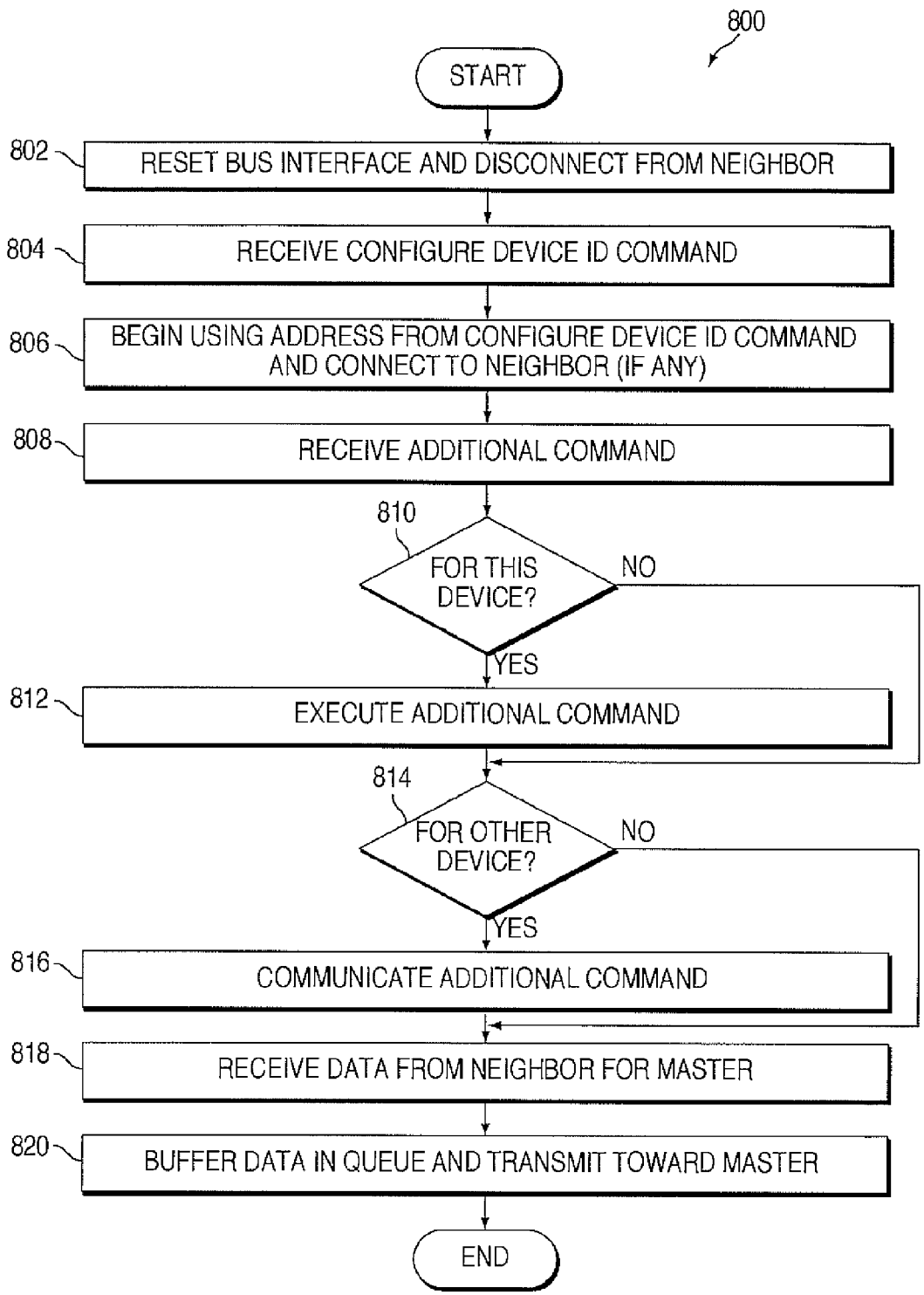

FIGS. 7 and 8 illustrate example methods for communicating over an isolated communication bus according to this disclosure. In particular, FIG. 7 illustrates an example method 700 used by a master device, and FIG. 8 illustrates an example method 800 used by a bus interface for a slave device.

As shown in FIG. 7, a master device broadcasts a disconnect or reset command at step 702. This could include, for example, the master device 102 broadcasting a Disconnect Devices command over the bus 106. The Disconnect Devices command resets the addresses of the bus interfaces 108a-108n and causes the bus interfaces 108a-108n to disconnect their B buses from neighboring interfaces.

The master device enumerates a bus interface by transmitting an enumeration command with an address at step 704, performing a test to see if a bus interface was enumerated at step 706, and determining if the test shows that a bus interface was enumerated at step 708. This could include, for example, the master device 102 transmitting a Configure Device ID command with an address of 00001. After that, the master device 102 could transmit a write command with specified data to the 00001 address, transmit a read command to the 00001 address, and determine if the read result matches the specified data. If successful, the master device 102 could return to step 704 and attempt to enumerate another bus interface. This process could repeat until the test fails, indicating that a bus interface was not successfully enumerated in response to the most recent configuration command.

At this point, the bus interfaces 108a-108n have been enumerated, and the master device can communicate with the slave devices 104a-104n using the bus interfaces 108a-108n. For example, the master device could transmit individual read or write commands over the bus to specific bus interfaces at step 710. The individual read or write commands could be internal commands directed at the bus interfaces 108a-108n or external commands directed at the slave devices 104a-104n. The master device could also transmit a broadcast write command over the bus at step 712 and a broadcast read command over the bus at step 714. The broadcast read and write commands could be internal commands directed at the bus interfaces 108a-108n or external commands directed at the slave devices 104a-104n. In response to the broadcast read command, the master device could receive a stream of transmitted values from the bus interfaces at step 716. The bus interfaces 108a-108n could use the queues 502 to provide a continuous or near-continuous stream of data values to the master device 102.

As shown in FIG. 8, a bus interface is reset and disconnects from a neighbor (if any) at step 802. This could be done, for example, in response to a Disconnect Devices command from the master device 102, a restart after a power failure, or at other times. At some point, the bus interface receives an enumeration command at step 804. This could include, for example, the bus interface receiving a Configure Device ID command over its A bus. The command could come directly from the master device 102 or through one or more preceding bus interfaces. In response to the command, the bus interface begins using an address from the enumeration command and connects to a neighboring bus interface (if any) at step 806. This could include, for example, the bus interface attempting to establish a connection with a neighboring bus interface over its B bus.

At this point, the bus interface has been enumerated and can receive an additional command over the bus at step 808. The command could be another Configure Device ID command or other configuration command or a communication command. The bus interface determines if the command is intended for itself or its associated slave device at step 810. If so, the command is executed by the bus interface or the associated slave device at step 812. The bus interface also determines if the command is intended for another bus interface or slave device at step 814. This may occur, for example, when a command is being sent to another bus interface through the current bus interface or when a broadcast command is being sent. If so, the command is communicated at step 816, such as by transmitting the command over the B bus.

The bus interface can also receive data from a neighboring bus interface for the master device at step 818, and the bus interface can queue the data and then transmit it towards the master device at step 820. This may occur, for example, in response to a broadcast read command that causes a stream of data values to be passed to the master device 102. The data from a higher bus interface can be received and stored in the queue 502 of the primary interface, before being passed to the queue in a lower bus interface or to the master device 102.

Although FIGS. 7 and 8 illustrate examples of methods for communicating over an isolated communication bus, various changes may be made to FIGS. 7 and 8. For example, while shown as a series of steps, various steps in each figure may overlap, occur in parallel, occur multiple times, or occur in a different order.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases that have been used within this patent document. The term "couple" and its derivatives refer to any direct or indirect communication between two or more components, whether or not those components are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

While this disclosure has described certain embodiments and generally associated methods, alterations and permutations of these embodiments and methods will be apparent to those skilled in the art. Accordingly, the above description of example embodiments does not define or constrain this invention. Other changes, substitutions, and alterations are also possible without departing from the spirit and scope of this invention as defined by the following claims.

What is claimed is:

1. A system comprising:
a master device and multiple slave devices; and
multiple bus interfaces forming a communication bus that couples the master and slave devices, each bus interface comprising:
  a primary interface unit configured to communicate over an A bus and a B bus, the A and B buses forming a portion of the communication bus;
  a secondary interface unit configured to communicate with the primary interface unit and to communicate with one of the slave devices over a C bus; and
  an isolator configured to electrically isolate the primary interface unit and the secondary interface unit;
  wherein the primary interface unit is configured to receive multiple commands over the A bus, execute a reset command, transmit and execute a first subset of commands, transmit a second subset of commands over the B bus, and transmit a third subset of commands over the C bus, the reset command setting all primary bus interface unit addresses to zero and all the primary bus interfaces have disconnected themselves from their second bus;
  the first subset comprising a first enumeration command for assigning a unique address to each of the multiple bus interfaces, the second subset comprising a second enumeration command.

2. The system of claim 1, wherein the primary interface unit in at least one of the bus interfaces is further configured to connect the B bus to a neighboring bus interface in response to the first enumeration command prior to transmitting the second enumeration command over the B bus.

3. The system of claim 1, wherein the primary interface unit in at least one of the bus interfaces is configured to:
receive a read or write command over the A bus;
determine if the read or write command is addressed to that bus interface;
if so, execute the read or write command; and
if not, transmit the read or write command over the B bus.

4. The system of claim 1, wherein the primary interface unit in at least one of the bus interfaces is configured to:
receive a broadcast read or write command over the A bus;
execute the broadcast read or write command; and
transmit the broadcast read or write command over the B bus.

5. The system of claim 4, wherein the primary interface unit in at least one of the bus interfaces comprises a queue configured to receive a data value over the B bus and to provide the data value for transmission over the A bus.

6. The system of claim 1, wherein:
the slave devices comprise voltage supply monitors, each voltage supply monitor associated with one or more voltage sources in a stack; and
the master device comprises a controller configured to cause the voltage supply monitors to obtain a snapshot of voltage measurements of voltages across the voltage sources in the stack and to retrieve the snapshot of voltage measurements from the voltage supply monitors.

7. The system of claim 1, further comprising:
a communication link coupling the master device to a last of the bus interfaces in the communication bus;
wherein the master device is further configured to: detect a break in the communication bus; and
in response to detecting the break, (i) cause at least one of the bus interfaces to lock a direction of communication through its A and B buses and (ii) cause at least one other of the bus interfaces to reverse the direction of communication through its A and B buses.

8. A method comprising:
performing an enumeration process that includes:
  a master device broadcasting a disconnect devices or reset devices command over a communication bus, wherein the addresses of the bus interfaces are reset and the bus interfaces are disconnected from neighboring interfaces;
  the master device transmitting multiple enumeration commands, each enumeration command providing a unique address generated by the master device, from the master device over the communication bus, the communication bus associated with multiple bus interfaces, the bus interfaces associated with multiple slave devices;
  wherein each of the bus interfaces is programmed with a unique address;
  determining whether the bus interfaces are enumerated with the proper unique addresses supplied by the multiple enumeration commands;
repeating the enumeration process until a determination is made that all bus interfaces are enumerated with the proper unique address supplied by the enumeration commands; and
transmitting multiple commands from the master device using the the unique addresses of the enumerated bus interfaces.

9. The method of claim 8, wherein:
transmitting the multiple commands comprises transmitting a broadcast read command; and
the method further comprises receiving data values serially from the slave devices, the data values comprising a stream of values received from each one of the slave devices.

10. A stacked system with an isolated communication bus comprising:
a master device;
a communication bus;
a plurality of bus interface units coupled to form the stacked system, wherein each bus interface unit comprises:
  a primary interface unit configured to communicate over an A bus and a B bus, the A and B buses configured to form a portion of a communication bus, the primary interface unit having a software programmable address;
  a secondary interface unit configured to communicate with the primary interface unit and to communicate over a C bus;
  an isolator configured to electrically isolate the primary interface unit and the secondary interface unit;
  wherein the master device is coupled to the A Bus of a first of the plurality of bus interface units by a first portion of the communication bus;
  wherein the B bus of the first of the plurality of bus interface units is coupled to the A Bus a of a second of the plurality of bus interface units by a second portion of the communication bus;
  wherein the B bus of the second of the plurality of bus interface units is coupled to the A Bus of a next of the plurality of bus interface units by a next portion of the communication bus;
  wherein the B bus of next of the plurality of bus interface units is coupled to the A Bus of the a next plus one of the plurality of bus interface units by a next plus one portion of the communication bus until all the plurality of bus interface units in the stack are coupled;
a plurality of slave devices, each integrated with a respective secondary interface unit, and each coupled to a respective one of the plurality of bus interface units by a respective C bus;
wherein the first primary interface unit is configured to:
receive multiple commands over the communication bus;
execute a first subset of commands, the first subset comprising:
a reset command wherein all primary bus interface unit addresses are set to zero and all the primary bus interface units are disconnected from their B bus;
a first enumeration command for assigning an address "address 1", wherein "address 1" is a unique address generated by the master device, to the first primary bus interface unit wherein the first primary bus interface unit connects its B bus to the A Bus of its neighbor primary bus interface unit;
a second enumeration command for assigning an address "address 2", wherein "address 2" is a unique address generated by the master device, to the second primary bus interface unit wherein the second primary bus interface unit connects its B bus to the A bus of a next primary interface unit;
enumeration commands continue until all primary bus interface units in the stacked system have been assigned addresses; and
wherein each primary bus interface unit executes a second subset of commands over its C bus to configure the respective slave devices.

11. The apparatus of claim 10, wherein the first primary interface Unit of the plurality of bus interface units is configured to:
receive a read or write command over the A bus of first primary interface Unit;
determine if the read or write command is addressed to itself;
if so, execute the read or write command; and
if not, transmit the read or write command over the B bus of the first primary interface Unit.

12. The apparatus of claim 10, wherein the first primary interface unit of the plurality of bus interface units is configured to:
receive a broadcast read or write command over the A bus of first primary interface Unit; execute the broadcast read or write command; and
transmit the broadcast read or write command over the B bus of first primary interface Unit.

13. The apparatus of claim 12, wherein the primary interface unit comprises a queue configured to receive a data value over the B bus and to provide the data value for transmission over the bus.

14. The apparatus of claim 10, wherein each of the primary and secondary interface units of the plurality of bus interface units comprises a pulse transceiver configured to:
generate first pulses for transmission over the isolator, the first pulses associated with rising and falling edges of a first data signal; and
receive second pulses over the isolator and reconstruct a second data signal using the second pulses.

15. The plurality of bus interface units of claim 10, wherein each isolator of the plurality of bus interface units comprises at least one suitable isolation technique such as transformers, galvanic or capacitive isolation.

* * * * *